(12) United States Patent
Kitamura et al.

(10) Patent No.: US 11,004,607 B2
(45) Date of Patent: May 11, 2021

(54) METHOD FOR MANUFACTURING MULTILAYER CERAMIC CAPACITOR

(71) Applicant: TAIYO YUDEN CO., LTD., Tokyo (JP)

(72) Inventors: Shohei Kitamura, Takasaki (JP); Yukihiro Konishi, Takasaki (JP); Kotaro Mizuno, Takasaki (JP); Yoichi Kato, Takasaki (JP); Yusuke Kowase, Takasaki (JP); Toru Makino, Takasaki (JP); Yoshinori Tanaka, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 273 days.

(21) Appl. No.: 15/903,712

(22) Filed: Feb. 23, 2018

(65) Prior Publication Data

US 2018/0190432 A1    Jul. 5, 2018

Related U.S. Application Data

(63) Continuation of application No. 15/084,303, filed on Mar. 29, 2016, now abandoned.

(30) Foreign Application Priority Data

Mar. 30, 2015   (JP) ................. 2015-069463

(51) Int. Cl.
*H01G 4/232*    (2006.01)
*H01G 4/30*     (2006.01)
*H01G 4/12*     (2006.01)

(52) U.S. Cl.
CPC ............... *H01G 4/232* (2013.01); *H01G 4/12* (2013.01); *H01G 4/30* (2013.01)

(58) Field of Classification Search
CPC .......... H01G 4/30; H01G 4/304; H01G 4/232; H01G 4/2325
See application file for complete search history.

(56) References Cited

U.S. PATENT DOCUMENTS 5,251,094 A   10/1993  Amano et al.
6,380,619 B2   4/2002  Ahiko et al.
(Continued)

FOREIGN PATENT DOCUMENTS

CN    102347131 A    2/2012
CN    103065792 A    4/2013
(Continued)

OTHER PUBLICATIONS

A Notification of Decision of Refusal issued by the Japanese Patent Office, dated Jul. 3, 2018, for Japanese counterpart application No. 2015-069463. (2 pages).
(Continued)

*Primary Examiner* — Livius R. Cazan
(74) *Attorney, Agent, or Firm* — Law Office of Katsuhiro Arai (57) ABSTRACT

A method for manufacturing a multilayer ceramic capacitor includes: producing a plurality of dielectric green sheets; producing therefrom a plurality of internal electrode-printed green sheets; producing therefrom a plurality of individually cut unsintered laminates by stacking some of the plurality of dielectric green sheets, as cover layers, and the plurality of internal electrode-printed green sheets together; producing therefrom element body precursors by applying a ceramic paste to side faces of the unsintered laminates for forming side margins thereon, wherein an application thickness of the ceramic paste is adjusted in a manner such that a thickness of the side margins is greater than a thickness of the cover layers in the final product; producing therefrom element bodies by sintering; and forming external electrodes on at least one of principal faces and on both end faces of the element bodies.

4 Claims, 5 Drawing Sheets

(56) References Cited

U.S. PATENT DOCUMENTS

| | | |
|---|---|---|
| 8,259,433 B2 | 9/2012 | Nishisaka et al. |
| 8,564,931 B2 | 10/2013 | Nishisaka et al. |
| 8,824,119 B2 | 9/2014 | Kim et al. |
| 9,082,556 B2 | 7/2015 | Fukunaga et al. |
| 9,129,746 B2 | 9/2015 | Lee et al. |
| 2001/0019176 A1 | 9/2001 | Ahiko et al. |
| 2006/0126264 A1 | 6/2006 | Yoshii et al. |
| 2008/0080120 A1 | 4/2008 | Togashi |
| 2008/0225462 A1 | 9/2008 | Motoki et al. |
| 2010/0123994 A1 | 5/2010 | Nishisaka et al. |
| 2011/0290542 A1 | 12/2011 | Nishisaka et al. |
| 2012/0048452 A1 | 3/2012 | Suh et al. |
| 2012/0099241 A1 | 4/2012 | Chang et al. |
| 2012/0147516 A1* | 6/2012 | Kim .................. H01G 4/30 361/301.4 |
| 2012/0229951 A1* | 9/2012 | Kim .................. H01G 4/30 361/321.2 |
| 2012/0250217 A1 | 10/2012 | Fukunaga et al. |
| 2012/0300361 A1 | 11/2012 | Togashi |
| 2012/0307418 A1 | 12/2012 | Kim et al. |
| 2012/0327556 A1 | 12/2012 | Ahn et al. |
| 2013/0020913 A1 | 1/2013 | Shirakawa et al. |
| 2013/0094118 A1 | 4/2013 | Kim et al. |
| 2013/0201601 A1 | 8/2013 | Nishisaka et al. |
| 2013/0222972 A1 | 8/2013 | Saito et al. |
| 2014/0233148 A1 | 8/2014 | Jeon et al. |
| 2014/0233149 A1 | 8/2014 | Jeon et al. |
| 2014/0285947 A1 | 9/2014 | Suga et al. |
| 2014/0292141 A1 | 10/2014 | Nishisaka et al. |
| 2014/0301012 A1 | 10/2014 | Kim |
| 2014/0355176 A1 | 12/2014 | Lee et al. |
| 2015/0021079 A1* | 1/2015 | Lee .................. H01G 4/012 174/260 |
| 2015/0022945 A1 | 1/2015 | Park et al. |
| 2015/0060122 A1 | 3/2015 | Lee et al. |
| 2015/0200054 A1 | 7/2015 | Lee et al. |
| 2015/0279564 A1* | 10/2015 | Naito .................. H01G 4/30 361/301.4 |
| 2015/0279568 A1* | 10/2015 | Saito .................. H01G 4/30 361/301.4 |
| 2015/0325377 A1 | 11/2015 | Takeuchi et al. |
| 2016/0284471 A1 | 9/2016 | Mizuno et al. |
| 2016/0284473 A1 | 9/2016 | Murosawa et al. |
| 2016/0293332 A1 | 10/2016 | Kato et al. |

FOREIGN PATENT DOCUMENTS

| | | |
|---|---|---|
| CN | 104078235 A | 10/2014 |
| JP | H09260197 A | 10/1997 |
| JP | 1131633 A | 2/1999 |
| JP | H11186092 A | 7/1999 |
| JP | H11340083 A | 12/1999 |
| JP | 2005259772 A | 9/2005 |
| JP | 2006332334 A | 12/2006 |
| JP | 2007103496 A | 4/2007 |
| JP | 2012004480 A | 1/2012 |
| JP | 2012094585 A | 5/2012 |
| JP | 2012195555 A | 10/2012 |
| JP | 2012253245 A | 12/2012 |
| JP | 2013187537 A | 9/2013 |
| JP | 2014236215 A | 12/2014 |
| JP | 2015023271 A | 2/2015 |
| JP | 2015026825 A | 2/2015 |
| KR | 20120043501 A | 5/2012 |
| KR | 20120085193 A | 7/2012 |
| KR | 20140117295 A | 10/2014 |
| KR | 1020140121725 A | 10/2014 |

OTHER PUBLICATIONS

A Notification of Reasons for Refusal issued by the Japanese Patent Office, dated Jan. 23, 2018, for Japanese counterpart application No. 2015-069463. (3 pages).

A Notification of Reasons for Refusal issued by the Japanese Patent Office, dated Sep. 3, 2019, for Japanese counterpart application No. 2015-069463. (7 pages).

Advisory Action issued by U.S. Patent and Trademark Office, dated Jan. 23, 2018, for U.S. Appl. No. 15/084,303.

Final Office Action issued by U.S. Patent and Trademark Office, dated Sep. 25, 2017, for U.S. Appl. No. 15/084,303.

Non-Final Office Action issued by U.S. Patent and Trademark Office, dated Jun. 1, 2017, for U.S. Appl. No. 15/084,303.

* cited by examiner

METHOD FOR MANUFACTURING MULTILAYER CERAMIC CAPACITOR

CROSS-REFERENCE TO RELATED APPLICATIONS

This application is a continuation of U.S. patent application Ser. No. 15/084,303, filed Mar. 29, 2016, which claims priority to Japanese Patent Application No. 2015-069463, filed Mar. 30, 2015, each disclosure of which is incorporated herein by reference in its entirety.

The applicant herein explicitly rescinds and retracts any prior disclaimers or disavowals made in any parent, child or related prosecution history with regard to any subject matter supported by the present application.

BACKGROUND

Field of the Invention

The present invention relates to a multilayer ceramic capacitor exhibiting excellent thermal shock resistance.

Description of the Related Art

In recent years, the high demand for smaller electronic components to support higher-density electronic circuits used in mobile phones, tablet terminals, and other digital electronic devices is accelerating the development of smaller, larger-capacitance multilayer ceramic capacitors (MLCC) which constitute these circuits.

The capacitance of a multilayer ceramic capacitor is directly proportional to the dielectric constant of the material constituting the dielectric layers that in turn constitute the capacitor, the number of dielectric layers, and the effective internal electrode layer area or specifically the area of the overlapping parts of the internal electrode layers led out to the external electrodes alternately, and is inversely proportional to the thickness of one dielectric layer. Accordingly, meeting the demand for smaller multilayer ceramic capacitors requires increasing the dielectric constant of the material, reducing the thickness of the dielectric layer, and increasing the number of dielectric layers.

However, reducing the thickness of the dielectric layer causes the dielectric laminate to undergo shrinkage strain during the sintering step of MLCC manufacturing process, which leads to delamination at the interface of the internal electrode and dielectric layer and cracking of the dielectric layer, thereby presenting a problem that the target characteristics cannot be ensured. To solve such problem, Patent Literature 1 discloses suppressing the shrinkage stress generating at the center of the dielectric layer in the direction of lamination, by adjusting the material of the internal electrode in such a way that the so-called "continuity" value of the internal electrode becomes lower toward the center of the dielectric layer in the direction of lamination.

Furthermore, Patent Literature 2, for the purpose of providing a highly reliable laminated ceramic electronic component capable of solving the crack failures in the dielectric laminate caused by thermal shocks applied in the mounting step, etc., discloses defining the continuity as (X−Y)/X, wherein X represents the length of a cross section of the internal electrode cut along its center in the long-side direction, while Y represents the total sum of gaps formed by the voids of the internal electrode present within the cross section, and setting the average of the continuities of the internal electrodes near the uppermost internal electrode in the direction of lamination, and the lowermost internal electrode in the direction of lamination, of the dielectrics, in such a way that it is lower than the average of the continuities of the remaining internal electrodes.

Figure 6:
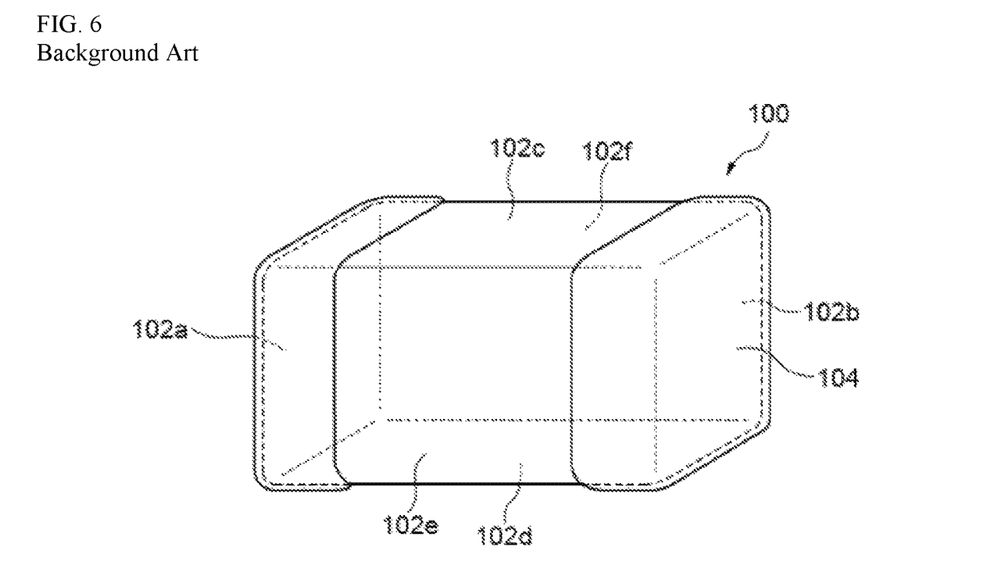
FIG. 6 shows a rough perspective view of a representative multilayer ceramic capacitor.

Incidentally, while FIG. 6 shows a rough perspective view of a representative multilayer ceramic capacitor, generally the faces on which the internal electrode layers are led out to left and right external electrodes 104 are called "end faces" 102a, b, the top and bottom faces in the direction of lamination of internal electrode layers and dielectric layers are called "principal faces" 102c, d, and the remaining pair of faces are called "side faces" 102e, f, in the case of the multilayer ceramic capacitor 100.

Furthermore, while the multilayer ceramic capacitor 100 has external electrodes on both of its end faces for connecting to a board, etc., as shown in FIG. 6, these external electrodes generally wrap around the other four faces in addition to the two end faces (so-called five-face electrodes) to allow for a board, etc., to be connected to any of the faces.

Background Art Literatures

[Patent Literature 1] Japanese Patent Laid-open No. Hei 11-31633

[Patent Literature 2] Japanese Patent Laid-open No. 2006-332334

SUMMARY

The constitutions disclosed in Patent Literatures 1 and 2 have void parts provided in the internal electrode layers, but presence of such voids reduces the effective area of internal electrode layers and thereby reduces the capacitance of the multilayer ceramic capacitor.

In addition, the multilayer ceramic capacitor has cover layers formed on it for the purpose of covering the top and bottom of the dielectric laminate in the direction of lamination, and these cover layers are normally formed using material similar to the material of the dielectric layer. Accordingly, the capacitance of the capacitor can be increased by reducing the thickness of the cover layer and thereby increasing the number of internal electrode layers to be stacked.

However, reducing the thickness of the cover layer causes the thermal shock resistance of the multilayer ceramic capacitor to drop and makes it easy for cracks to generate in the cover layer, particularly where the external electrode is wrapped around the principal face, and it became clear that such a problem of cracks cannot be solved by the constitutions proposed in Patent Literatures 1 and 2.

Accordingly, a primary object of the present invention is to provide a large-capacitance multilayer ceramic capacitor exhibiting excellent thermal shock resistance while suppressing generation of cracks sufficiently. In addition, a secondary object of the present invention is to achieve high thermal shock resistance, and sufficiently suppress generation of cracks, in a large-capacitance multilayer ceramic capacitor having extremely thin cover layers of 30 μm or less.

Any discussion of problems and solutions involved in the related art has been included in this disclosure solely for the purposes of providing a context for the present invention, and should not be taken as an admission that any or all of the discussion were known at the time the invention was made.

After studying in earnest to achieve the aforementioned objects, the inventors of the present invention found that, by limiting the faces on which the external electrode is formed to reduce the stress generating as a result of thermal expansion of the external electrode, and also by maintaining a specific relationship between the thickness of the external electrode and thickness of the cover layer, a large capacitance could be achieved and at the same time the thermal shock resistance of the multilayer ceramic capacitor could be increased to sufficiently suppress generation of cracks, and thereby completed the present invention.

In other words, the present invention is a multilayer ceramic capacitor having an element body of roughly rectangular solid shape which is constituted by dielectric layers alternately stacked with internal electrode layers having different polarities, with a pair of cover layers formed on it to cover the top and bottom faces in the direction of lamination of the foregoing, and which has a pair of principal faces, a pair of end faces, and a pair of side faces, wherein external electrodes are formed on the pair of end faces and at least one of the pair of principal faces of the element body, and Tt representing the thickness of the external electrode and Tc representing the thickness of the cover layer satisfy the relationship of Tt≤Tc.

From the viewpoint of preventing solder leaching when mounting the multilayer ceramic capacitor, preferably the thickness of the external electrode, or Tt, is greater than 1 μm.

In addition, when the thickness of the cover layer, or Tc, is 10 μm or more but 30 μm or less, such thinness of the cover layer allows for an increase in the number of internal electrode layers to be stacked and consequent increase in the capacitance of the multilayer ceramic capacitor, as well as improvement of the moisture resistance reliability of the capacitor.

According to the present invention, a multilayer ceramic capacitor can be provided which has large capacitance and also exhibits excellent thermal shock resistance while sufficiently suppressing generation of cracks.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

10 Multilayer ceramic capacitor
12a, b End face
12c, d Principal face
12e, f Side face
14 External electrode
16 Element body
17 Dielectric layer
18 Internal electrode layer
20 Laminate
22 Cover layer
24 Side margin
30 Normal line of the bottom internal electrode layer
32 Position corresponding to the end of the internal electrode layer
34 Normal line of the cover layer
100 Multilayer ceramic capacitor
102a, b End face
102c, d Principal face
102e, f Side face
104 External electrode
200 Internal electrode pattern
202 Bar-like laminate
204 Side margin
206 Laminate chip
300 Laminate chip
302 Group stage
304a to d Block material
306 Squeegee

DETAILED DESCRIPTION OF EMBODIMENTS

Figure 1:
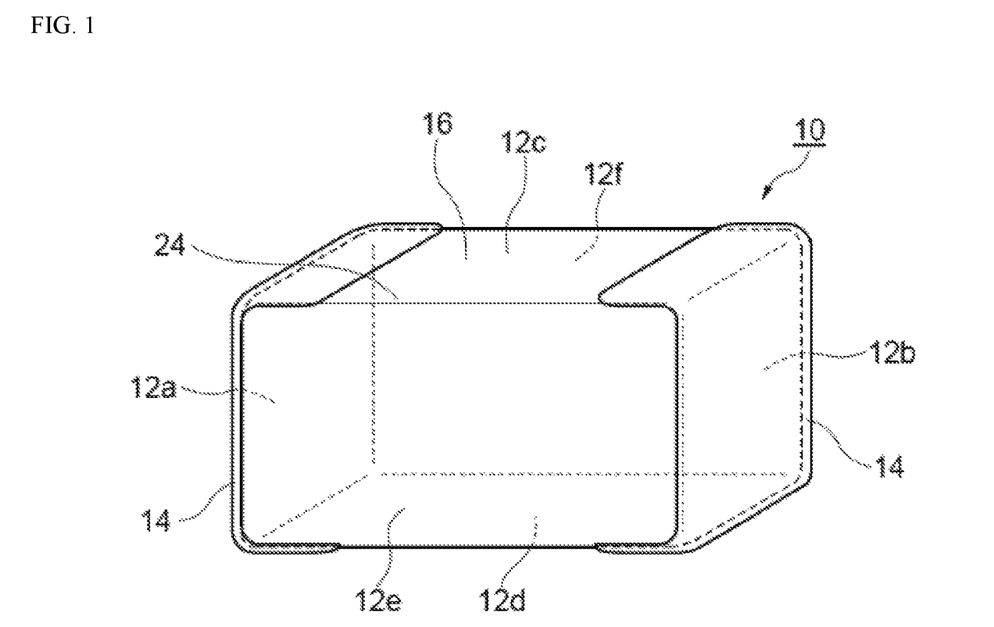
FIG. 1 shows a rough perspective view of a multilayer ceramic capacitor conforming to the present invention.

The multilayer ceramic capacitor in an embodiment of the present invention is explained below. FIG. 1 is a rough perspective view of a multilayer ceramic capacitor 10 conforming to the present invention. Also under the present invention, the faces on which the internal electrode layers are led out to left and right external electrodes 14 are called "end faces" 12a, b, the top and bottom faces in the direction of lamination of the internal electrode layers and dielectric layers are called "principal faces" 12c, d, and the remaining pair of faces are called "side faces" 12e, f, as under the prior art.

[Multilayer Ceramic Capacitor]

Figure 2:
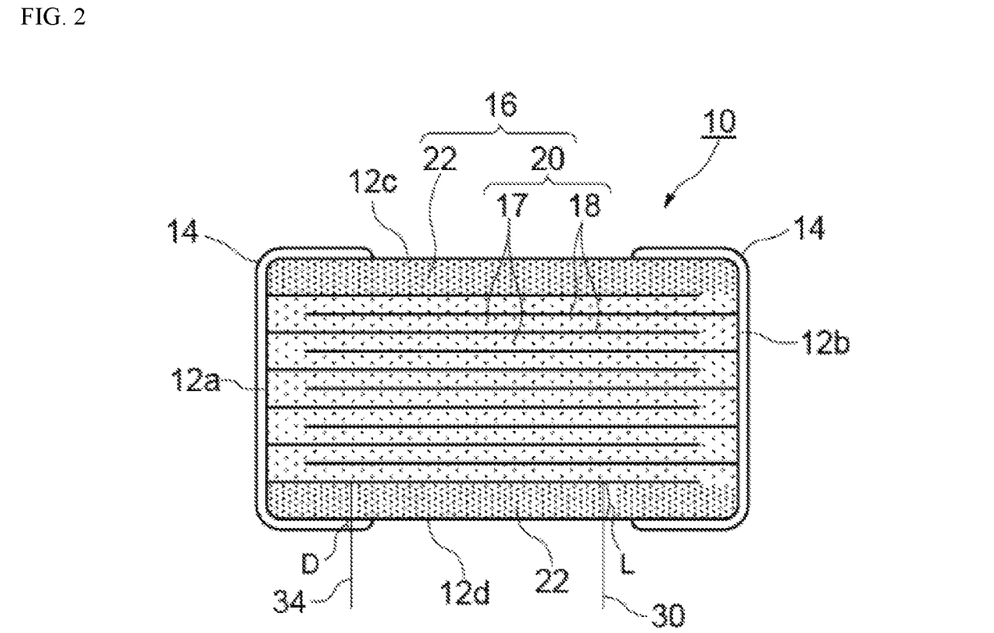
FIG. 2 shows a schematic view of a cross section of the multilayer ceramic capacitor 10 conforming to the present invention, cut in parallel with its side faces 12e, f.

FIG. 2 shows a schematic view of a cross section of the multilayer ceramic capacitor 10 conforming to the present invention, cut in parallel with its side faces 12e, f. The multilayer ceramic capacitor 10 is generally constituted by an element body 16 having standardized chip dimensions and shape (such as rectangular solid of 1.0×0.5×0.5 mm), as well as a pair of external electrodes 14 primarily formed on both end face sides of the element body 16. The element body 16 has a laminate 20 whose primary component is grain crystal of $BaTiO_3$, $CaTiO_3$, $SrTiO_3$, $CaZrO_3$, etc., and which is constituted by dielectric layers 17 alternately stacked with internal electrode layers 18, as well as a pair of cover layers 22 formed as the uppermost and lowermost layers in the direction of lamination to cover the top face and bottom face of the laminate 20. Additionally, though not illustrated, there are side margins 24 that form the pair of side faces 12e, f by covering the laminate 20 (internal electrode layers 18 thereof) so it will not be exposed to the outside (refer to FIG. 3).

The laminate 20 is such that the thickness of the internal electrode layer 18 and that of the dielectric layer 17 sandwiched by two internal electrode layers 18 are set within specified ranges according to the static capacitance, required withstand voltage, and other specifications, and has a high-density multi-layer structure consisting of a total of around several hundred to a thousand layers.

The cover layers 22 and side margins 24 formed around the laminate 20 protect the dielectric layers 17 and internal electrode layers 18 against moisture, contaminants and other polluting substances from the outside and prevent them from deteriorating over time.

Also, the internal electrode layers 18 are alternately led out to and electrically connected at their edges with a pair of external electrodes 14 that are present on both ends of the dielectric layers 17 in the length direction and that each have a different polarity.

The thickness of the cover layer 22, or Tc, is not limited in any way, but under the present invention, it is preferably 30 μm or less, or more preferably 10 μm or more but 30 μm or less, from the viewpoint of increasing the capacitance of the multilayer ceramic capacitor 10. When Tc is 30 μm or less, the number of internal electrode layers 18 to be stacked can be increased by the reduced thickness of the cover layer 22, which allows the capacitance of the multilayer ceramic capacitor 10 to be increased. Also, when Tc is 30 μm or less, the thermal shock resistance of the capacitor 10 tends to drop, but due to the constitution of the present invention described later, the effect of improving the thermal shock resistance of the capacitor 10 becomes pronounced. And, when Tc is 10 μm or more, the capacitor 10 also exhibits moisture resistance reliability.

Under the present invention, the thickness of the cover layer 22, or Tc, is obtained as follows. A cross section is cut off from the multilayer ceramic capacitor 10 in parallel with the side faces 12e, f and it is observed with an optical microscope at a magnification of 200 times. An image like the one shown in FIG. 2 is obtained, for example, and in this image, the maximum value of the length L (thickness), from the point of intersection between a normal line 30 (there are multiple normal lines) of the internal electrode layer 18 at the top end or bottom end of the laminate 20 and the interface of the internal electrode layer 18 at the applicable end and the cover layer 22, to the point of intersection between the cover layer 22 and its exterior and the normal line 30, is obtained. This is repeated for 10 multilayer ceramic capacitors 10, for example, and the average of the 10 maximum values of L is used as the thickness of the cover layer 22, or Tc, under the present invention. In embodiments, the greatest thickness L refers to a greatest thickness of the cover layer 22 constituting the principal face 12d (or 12c) wherein a thickness of the cover layer 22 varies due to ordinary manufacturing variance, rather than intentional change in dimension.

Also under the present invention, a Tc of 30 μm or less, for example, means that the thickness Tc is 30 μm for each of the cover layers 22 at the top and bottom of the laminate 20.

Under the present invention, preferably the cover layer 22 is formed thinly as described above, but this way the thermal shock resistance of the multilayer ceramic capacitor 10 may drop and cracks may generate in the various steps involving heat, such as when mounting the capacitor 10.

Under the present invention, (1) external electrodes 14 are formed on the pair of end faces 12a, b and at least one of the pair of principal faces 12c, d of the element body 16, and (2) Tt representing the thickness of the external electrode 14 and Tc representing the thickness of the cover layer 22 satisfy the relationship of Tt≤Tc, in order to prevent such drop in thermal shock resistance.

In (1) above, since the external electrode 14 generally has a higher coefficient of thermal expansion than the dielectrics primarily constituting the element body 16, stress generates in the element body 16 and this stress can cause cracking easily. With a conventional multilayer ceramic capacitor, the external electrodes wrap around not only the two end faces, but also the remaining four faces, as explained in the section of "Related Art", and this leads to greater impact of thermal expansion and easy generation of cracks.

Accordingly, under the present invention, the constitution in (1) above is adopted and external electrodes are substantially not formed on the pair of side faces 12e, f, in order to reduce this impact of thermal expansion (refer to FIG. 1).

Figure 3:
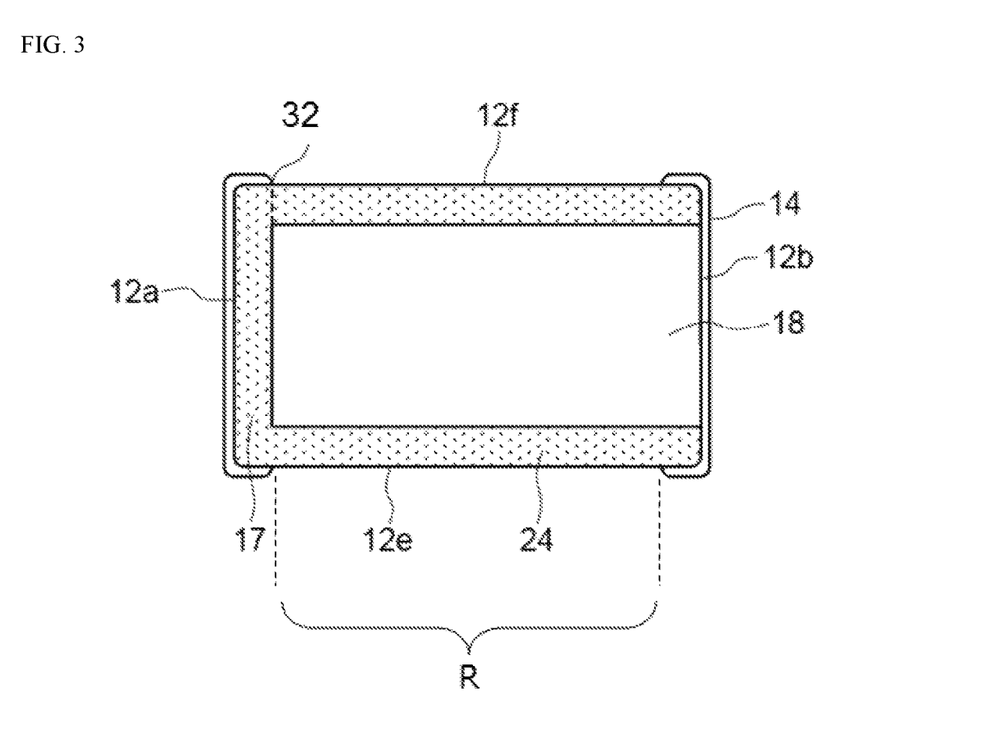
FIG. 3 shows a schematic view of a cross section of the multilayer ceramic capacitor 10, cut in such position that the internal electrode layer 18 running in parallel with the principal faces 12c, d is visible.

Incidentally, "substantially not formed on the pair of side faces 12e, f" includes not only where external electrodes 14 are not present at all on the entire side faces 12e, f, but also where the external electrodes 14 extend partially or slightly to the side faces. To be specific, while FIG. 3 is a schematic cross sectional view of the multilayer ceramic capacitor 10, cut in such position that the internal electrode layer 18 running in parallel with the principal faces 12c, d is visible, an external electrode 14 may be formed on the side face 12f from the point of intersection between the side face 12f and end face 12a, to a position 32 corresponding to the end, on the end face 12a side, of the internal electrode layer 18 led out to the end face 12b side, for example. The same applies to the end face 12b and side face 12e on the opposite side. That is, no external electrodes are formed in a region R of the pair of side faces 12e, 12f where the internal electrode layers 18 having different polarities overlap as viewed in a thickness direction.

Also, under the present invention, external electrodes 14 are formed on at least one of the pair of principal faces 12c, d, which means that substantially no external electrode 14 may be formed on one principal face 12c, for example. Here, "substantially no external electrode 14 may be formed on one principal face 12c" includes not only where an external electrode 14 is not present at all on the entire principal face 12c, but also where an external electrode 14 extends partially or slightly to the principal face 12c from the point of intersection between the principal face 12c and end face 12a, at maximum up to the position corresponding to the end, on the end face 12a side, of the internal electrode layer 18 led out to the end face 12b side, for example (the end of the region R), as is the case with the side faces 12e, f The same applies to the end face 12b on the opposite side.

Under the present invention, with respect to the principal faces 12c, d, preferably external electrodes 14 are formed on only one of the pair of principal faces 12c, d (i.e., substantially or completely no external electrodes 14 are formed on the other of the pair of principal faces 12c, d). This way, the absence of external electrodes on the other principal face allows for an increase in the number of internal electrode layers 18 to be stacked, and consequently an increase in the capacitance of the multilayer ceramic capacitor 10. Another reason is that the impact of the external electrodes 14 of high coefficient of thermal expansion decreases compared to when they are formed on both principal faces. On the principal face where the external electrodes 14 have been formed, the external electrodes 14 do not cover the entire principal face, but they are formed on the end face 12a side and end face 12b side separated with a certain distance. In addition, the thickness of the external electrode 14, or Tt, represents the overall thickness including the base electrode contacting the ceramics and the plating constituted by Cu, Ni, Sn, etc.

Then, regarding (2) above, or "Tt representing the thickness of the external electrode 14 and Tc representing the thickness of the cover layer 22 satisfy the relationship of Tt≤Tc," the thickness of the external electrode 14, or Tt, is obtained as follows under the present invention. A cross section is cut off from the multilayer ceramic capacitor 10 in parallel with the side faces 12e, f and it is observed with an optical microscope at a magnification of 200 times. An image like the one shown in FIG. 2 is obtained, for example, and in this image, the maximum value of the length D (thickness), from the point of intersection between a normal line 34 (there are multiple normal lines) on the principal face on the cover layer 22 and the interface of the cover layer 22 and external electrode 14, to the point of intersection between the interface of the external electrode 14 and its exterior and the normal line 34, is obtained. This is repeated for 10 multilayer ceramic capacitors 10, for example, and the average of the 10 maximum values of D is used as the thickness of the external electrode 14, or Tt, under the present invention. In embodiments, the greatest thickness D refers to a greatest thickness of the external electrode 14 on the principal face 12d (or 12c) wherein a thickness of the external electrode 14 on the principal face 12d (or 12c) varies due to ordinary manufacturing variance, rather than intentional change in dimension.

While the boundary of the principal face and end face is not clear in FIG. 2, in this case the principal face is considered to start from the end of the curved part of the end face.

Under the present invention, the Tt thus defined and the cover layer thickness Tc satisfies the condition of Tt≤Tc, or specifically the thickness of the external electrode 14 (where it overlaps with the cover layer 22) is equal to or less than the thickness of the cover layer 22. By keeping the cover layer 22 at a thickness equal to or greater than the thickness of the external electrode 14 of high coefficient of thermal expansion, as described above, the stress generated from the thermal expansion of the external electrode 14 caused by various thermal shocks in the mounting of the multilayer ceramic capacitor 10 and other steps can be reduced and generation of cracks can be prevented.

While under the present invention the external electrodes 14 are formed on at least one of the pair of principal faces 12c, d, as described above, if they are formed on both of these faces, then the condition of Tt≤Tc is satisfied by both external electrodes 14.

Then, from the viewpoint of preventing solder leaching when the multilayer ceramic capacitor 10 conforming to the present invention is mounted, preferably the thickness of the external electrode, or Tt, is greater than 1 μm.

In addition, from the viewpoint of increasing the capacitance of the multilayer ceramic capacitor 10 conforming to the present invention, preferably the thickness of the dielectric layer 17 is kept to 0.8 μm or less. This is because, by reducing the thickness of the dielectric layer 17, the capacitance increases and also the number of internal electrode layers 18 to be stacked can be increased by the reduced thickness of the dielectric layer 17.

Also, while the thickness of the internal electrode layer 18 and that of the side margin 24 are not limited in any way with the multilayer ceramic capacitor 10 conforming to the present invention, the thickness of the internal electrode layer 18 is normally 0.26 to 1.00 μm, while the thickness of the side margin 24 is normally 4 to 50 μm.

[Manufacturing Method of Multilayer Ceramic Capacitor]

Next, the manufacturing method of the multilayer ceramic capacitor conforming to the present invention as described above is explained.

First, material powder for forming the dielectric layer is prepared. For the material powder, $BaTiO_3$, $CaTiO_3$, $SrTiO_3$, $CaZrO_3$ and various other powders that can be used to form ceramic sintered compact can be used.

These powders can be synthesized by causing various metal materials to react together. Various synthesizing methods are known, such as the solid phase method, sol-gel method, and hydrothermal method, among others. Under the present invention, any of these methods can be adopted.

To the obtained material powder, compounds that constitute secondary constituents can be added by specified amounts according to the purposes. Secondary constituents include oxides of rare earths such as Nd, Sm, Eu, Gd, Tb, Dy, Ho, and Er, as well as oxides of Mg, Mn, Ni, Co, Fe, Cr, Cu, Al, Mo, W, V, and Si.

The material powder obtained as above can be pulverized to adjust the grain size, or pulverized and then classified to regulate the grain size, as necessary, for example.

Then, binder such as polyvinyl butyral (PVB) resin, organic solvent such as ethanol or toluene, and plasticizer such as dioctyl phthalate (DOP) are added to the material powder and the ingredients are wet-mixed. The obtained slurry is applied on a base material in strips using the die-coater method or doctor blade method, for example, after which the slurry is dried to obtain a dielectric green sheet of 1.2 μm or less in thickness. Then, on the surface of the obtained dielectric green sheet, a metal conductive paste containing organic binder is printed by means of screen printing or gravure printing to arrange patterns of internal electrode layers to be led out alternately to the pair of external electrodes each having a different polarity. For the aforementioned metal, nickel is widely adopted from the viewpoint of cost.

Thereafter, the dielectric green sheet on which internal electrode layer patterns have been printed is stamped out to specified sizes and the stamped-out dielectric green sheets are stacked together by a specified number (such as 100 to 1,000 layers) so that when the base material is separated, the internal electrode layers and dielectric layers are staggered and also the edges of the internal electrode layers are exposed on both end faces of the dielectric layers in the length direction and led out alternately to the pair of external electrodes each having a different polarity. Cover sheets that will become the cover layers are pressure-welded on top and bottom of the stacked dielectric green sheets and the welded sheets/covers are cut to specified chip dimensions (such as 1.0 mm×0.5 mm×0.5 mm in sizes after sintering).

Here, while preferably the thickness of the cover layer 22, or Tc, is 30 μm or less, as described above, Tc may be adjusted to a desired value by properly selecting the conditions such as the amount of dielectric paste to be applied on the base material when the cover sheet is formed, or the printing type when dielectric paste is printed.

Also, for the method to form side margins, any of the various methods that are known can be adopted without any limitation at all; when cutting to the specified chip dimensions, for example, instead of cutting exactly at the positions of the internal electrode layers, cut a little wider so that parts of the dielectric layer not covered by the internal electrode layer are also included because, this way, a side margin of desired thickness can be formed on both side faces of the laminate to obtain an element body precursor that will become the element body 16 after sintering.

Figure 4A:
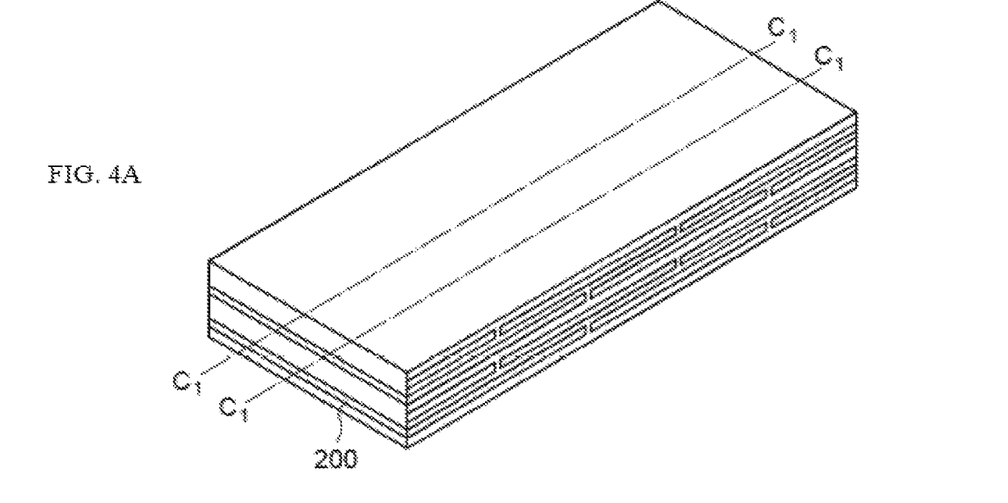
FIG. 4A, FIG. 4B, and FIG. 4C show schematic views showing one example of how side margins are formed.

Furthermore, a different method can be used to form side margins as follows. To be specific, as shown in FIG. 4A, take multiple dielectric green sheets on which internal electrode patterns 200 have been printed in stripes at a specified interval (this interval corresponds to twice the distance between the external electrode 14 and the edge of the internal electrode layer 18 led out to the external electrode 14 on the opposite side of the aforementioned external electrode 14 in FIG. 2), and stack the dielectric green sheets so that the center of the stripe is superimposed with the interval part between the internal electrode patterns 200.

Figure 4B:
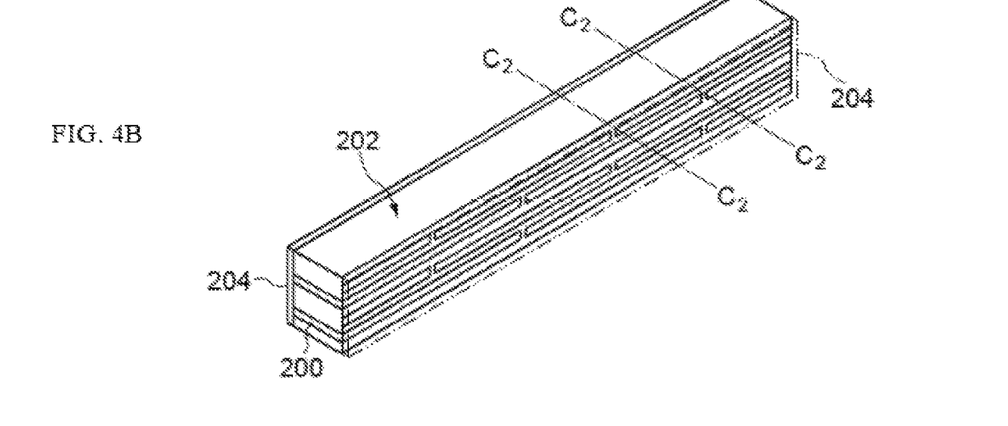

Cut this along line $C_1$-$C_1$ so that the striped internal electrode patterns 200 are cut across, to obtain a bar-like laminate 202 not having a pair of opposing side margins 204 as shown in FIG. 4B. Here, the cutting width (distance between the cross sections produced by cutting) corresponds to the size of the multilayer ceramic capacitor to be manufactured, or specifically to the distance between the pair of side faces 12e, f of the element body 16.

Figure 4C:
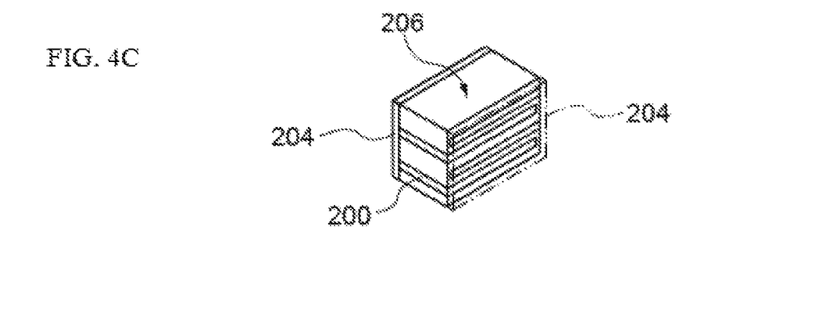

Side margins 204 are formed on the side faces of the obtained bar-like laminate 202 (normally side margins are formed using a material similar to that of the dielectric layers 17), which is then cut along line $C_2$-$C_2$ into individual chip sizes (line $C_2$-$C_2$ passes through the center of an internal electrode pattern 200 or center of the interval between internal electrode patterns 200), to obtain individual laminate chips 206 (FIG. 4C). On this chip 206, the internal electrodes are led out alternately on the cross sections produced by the aforementioned cutting and this chip 206 represents an element body precursor that will become the element body 16 after sintering.

Figure 5:
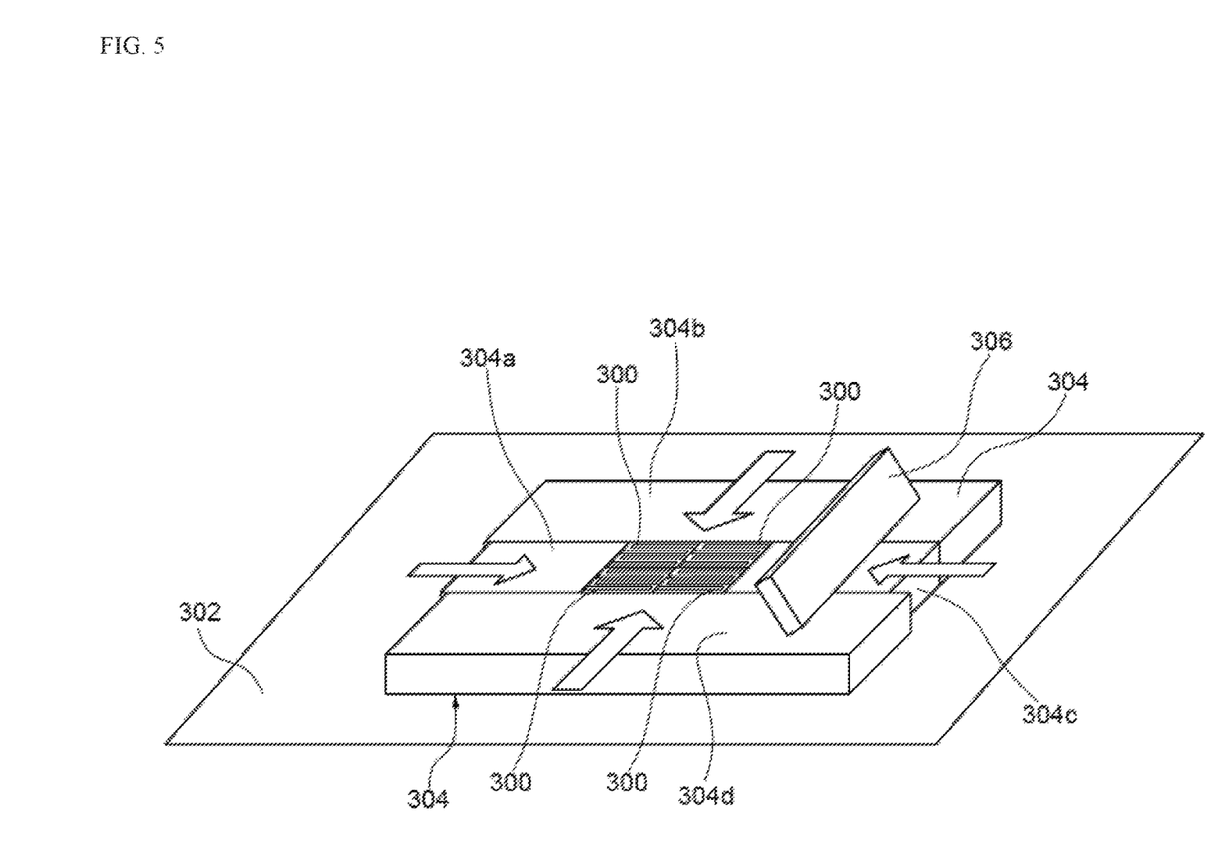
FIG. 5 shows a schematic view showing one example of how side margins are formed.

Also, a different method can be used to form side margins as follows. To be specific, as shown in FIG. 5, the laminate of dielectric green sheets is cut exactly at the positions of the internal electrode layers or slightly inside, and the obtained laminate chips 300 (the internal electrode layers are exposed on their side face) are arranged on a group stage 302 so that their side face faces up. Then, on the group stage 302, multiple block materials 304a to 304d that can slide in the directions of the arrows as shown in the figure are caused to slide on the group stage 302 in the directions of the arrows. This way, an aggregate of rectangular planar shape constituted by multiple laminate chips 300 adhering together is obtained.

Then, in this condition, a squeegee 306 is used to apply a ceramic paste (normally material similar to the one used to form the dielectric layers 17) to form a ceramic paste layer of specified thickness on the top face of the aggregate and then the paste is dried. This thickness can be adjusted by adjusting the difference between the height of the arranged laminate chips 300 and the height of the block materials 304.

Since the ceramic paste layer is formed over the entire surface of the aggregate of laminate chips 300, a roller may be run over the top face of the aggregate under pressure or a blade may be pressed against positions corresponding to the boundaries of the laminate chips 300, to divide the ceramic paste layer to cover individual laminate chips 300.

This way, a side margin of specified thickness is formed on one side face of the laminate chip 300, and by flipping the chip and repeating the same operation as described above, a side margin can be formed on the other side face in a similar manner and an element body precursor that will become the element body 16 after sintering can be obtained.

In addition, the corners of the element body precursor may be chamfered after the cover layers and side margins have been formed, to shape the element body precursor in such a way that the connection part of each side of the element body precursor is curved. This way, chipping of the corners of the element body precursor can be suppressed.

To achieve this shape, all that is needed is, for example, to put water, multiple element body precursors and polishing medium, into a sealed rotary pot made of polyethylene or other material, and rotate this sealed rotary pot to chamfer the corners of the element body precursors.

The element body precursors obtained as above, constituted by the laminate of dielectric layers and internal electrode layers, cover layers covering the top and bottom principal faces of the laminate, and side margins covering both side faces of the laminate, are put in an $N_2$ ambience of 250 to 500° C. to remove the binder, and then sintered for 10 minutes to 2 hours in a reducing ambience of 1100 to 1300° C., to sinter and densify each compound constituting the aforementioned dielectric green sheet. This way, the element body 16 of the multilayer ceramic capacitor 10 conforming to the present invention is obtained.

Under the present invention, re-oxidizing treatment can also be given at 600 to 1000° C.

Then, external electrodes 14 are formed on both end faces and at least one principal face of the obtained element body 16. To form external electrodes at such specific positions, the method below may be adopted, for example.

The element bodies 16 are arranged so that their principal face or side face contacts the bottom, and an external electrode paste constituted by Cu or other metal grains, ethyl cellulose or other organic binder, dispersant, and solvent is applied to at least one principal face by means of printing, which external electrode paste is then dried to form external electrodes on the principal face. Thereafter, both end faces of the element body 16 are dip-coated with a similar paste, followed by drying and baking. Thereafter, Ni/Sn plating film is formed.

The formation of external electrodes 14 on at least one principal face can also be implemented by using, when forming the cover layers, cover sheets whose surface has been pre-printed with external electrode patterns.

Also, external electrodes 14 can be formed by means of sputtering or deposition on the principal face and end face.

External electrodes 14 can be formed by various methods as described above and, when this forming is performed, the thickness of the external electrode 14, or Tt, can be adjusted to a desired value by adjusting the amount of external electrode paste to be applied during printing or by adjusting the sputtering amount or deposition amount in sputtering or deposition.

This way, external electrodes 14 are formed on the pair of end faces and at least one of the pair of principal faces of the element body 16, and consequently the multilayer ceramic capacitor 10 conforming to the present invention is obtained, where the thickness of the external electrode 14, or Tt, and the thickness of the cover layer 22, or Tc, satisfy a specified relationship.

EXAMPLES

The present invention is explained in greater detail below using examples. It should be noted, however, that the present invention is not limited to these examples in any way.

[Manufacturing of Multilayer Ceramic Capacitor]

Dy and Mg were each added by 1.0 mol, and V and Mn were each added by 0.5 mol, per 100 mol of barium titanate of 0.1 μm in average grain size, into which organic solvent whose primary constituent is alcohol, polyvinyl butyral resin, dispersant, and plasticizer were mixed and dispersed to produce a coating slurry. Then, this slurry was coated on a base material using a die-coater to produce a dielectric green sheet. The amount of slurry supplied to the die-coater was adjusted to control the thickness of the sheet.

Next, the aforementioned dielectric green sheet was screen-printed with a conductive paste prepared by mixing and dispersing Ni powder of 200 nm in average grain size, organic solvent whose primary constituent is alcohol, ethyl cellulose resin, dispersant, and plasticizer, to produce a dielectric green sheet printed with internal electrodes. The concentration of solid matter in the conductive paste was adjusted by the amount of paste solvent, to control the thickness of the internal electrode.

Multiple layers of dielectric green sheets (for forming the cover layers) and multiple layers of dielectric green sheets printed with internal electrodes were stacked together and then pressure-bonded and cut to produce individual unsintered laminates. The number of dielectric green sheet layers was changed to change the thickness of the cover layer.

The unsintered laminates were arranged so that their side margin face (side face) faced up, while Dy and Mg were each added by 1.0 mol, and V and Mn were each added by 0.5 mol, per 100 mol of barium titanate of 0.1 μm in average grain size, into which organic solvent whose primary constituent is alcohol, ethyl cellulose resin, dispersant, and plasticizer were mixed and dispersed to produce a ceramic paste. Then, this ceramic paste was applied to the top faces of the arranged unsintered laminates and then dried, to form side margins. The application thickness of the paste was adjusted to control the thickness of the side margins. The opposing side margin face was also treated in a similar manner, and an element body precursor was obtained as a result.

Water, multiple element body precursors, and polishing medium were put in a sealed rotary pot and this sealed rotary pot was rotated to chamfer the corners of the element body precursors.

The element body precursors thus obtained, each constituted by the laminate of dielectric layers and internal electrode layers, cover layers covering the top and bottom principal faces of the laminate, and side margins covering both side faces of the laminate, were put in an $N_2$ ambience of 250 to 500° C. to remove the binder, and then sintered for 10 minutes to 2 hours in a reducing ambience of 1100 to 1300° C.

The obtained element bodies were arranged so that their principal face or side face contacted the bottom, and an external electrode paste constituted by Cu grains, ethyl cellulose, dispersant, and solvent was applied to one principal face by means of printing and then dried to form external electrodes on the principal face. Thereafter, both end faces of the element body were dip-coated with a similar paste and then dried and baked. Thereafter, Ni/Sn plating film was formed.

Multilayer ceramic capacitors of the constitution shown below were manufactured as described above:

| | |
|---|---|
| Chip dimensions (L × W × H) | 1.0 mm × 0.5 mm × 0.5 mm |
| Thickness of dielectric layer | 0.7 μm |
| Number of dielectric layers | 315 layers |
| Thickness of internal electrode layer | 0.7 μm |
| Number of internal electrode layers | 315 layers |
| Thickness of cover layer | 8 to 30 μm |
| Thickness of side margin | 35 μm |
| Thickness of external electrode (including plating) | 1 to 36 μm |

The obtained multilayer ceramic capacitors in the examples and comparative examples were each evaluated for various properties as described below.

[Thermal Shock Resistance Test]

50 multilayer ceramic capacitors from each of the examples and comparative examples were soaked for 1 second in a solder bath of 300° C. in temperature to check for presence or absence of cracks. "Passed" was indicated if none of the capacitors generated cracks.

[Moisture Resistance Test]

300 multilayer ceramic capacitors from each of the examples and comparative examples were measured for the resistance of the capacitor in an environment of 85° C. in temperature and 85% in humidity after a voltage of 5 VDC was applied for 1,000 hours. "Passed" was indicated if none of the capacitors registered an insulation resistance of $10^6 \Omega$ or less (moisture resistance abnormality).

[Mounting Test]

100 multilayer ceramic capacitors from each of the examples and comparative examples were each mounted on a printed circuit board using solder and checked for contact. "Passed" was indicated if none of the capacitors exhibited conductivity failure.

The results of the above evaluations are summarized in Table 1 below.

TABLE 1

| Thickness of cover layer Tc (μm) | Thickness of external electrode Tt (μm) | Tt/Tc | Thermal shock resistance test (Number of cracks generated) | Moisture resistance test (Number of moisture resistance abnormalities) | Mounting test (Number of conductivity failures) |
|---|---|---|---|---|---|
| 8 | 9.8 (Comparative example) | 6/5 | Failed (15) | Failed (9) | Failed (11) |
| | 6.4 (Example) | 4/5 | Passed | Failed (6) | Passed |
| | 1.6 (Example) | 1/5 | Passed | Failed (4) | Passed |
| | 1 (Example) | 1/8 | Passed | Failed (10) | Passed |
| 10 | 12 (Comparative example) | 6/5 | Failed (10) | Passed | Failed (9) |
| | 8 (Example) | 4/5 | Passed | Passed | Passed |
| | 2 (Example) | 1/5 | Passed | Passed | Passed |
| | 1 (Example) | 1/10 | Passed | Passed | Passed |

TABLE 1-continued

| Thickness of cover layer Tc (μm) | Thickness of external electrode Tt (μm) | Tt/Tc | Thermal shock resistance test (Number of cracks generated) | Moisture resistance test (Number of moisture resistance abnormalities) | Mounting test (Number of conductivity failures) |
|---|---|---|---|---|---|
| 20 | 24 (Comparative example) | 6/5 | Failed (7) | Passed | Failed (6) |
| | 16 (Example) | 4/5 | Passed | Passed | Passed |
| | 4 (Example) | 1/5 | Passed | Passed | Passed |
| | 2 (Example) | 1/10 | Passed | Passed | Passed |
| | 1 (Example) | 1/20 | Passed | Passed | Passed |
| 30 | 36 (Comparative example) | 6/5 | Failed (5) | Passed | Failed (3) |
| | 24 (Example) | 4/5 | Passed | Passed | Passed |
| | 6 (Example) | 1/5 | Passed | Passed | Passed |
| | 3 (Example) | 1/10 | Passed | Passed | Passed |
| | 1 (Example) | 1/30 | Passed | Passed | Passed |

As is evident from Table 1, all of the comparative examples, where the thickness of the external electrode, or Tt, was greater than the thickness of cover layer, or Tc, failed the thermal shock resistance test and mounting test; however, all of the examples where Tt was equal to or less than Tc passed the thermal shock resistance test and mounting test.

In addition, the result of moisture resistance test was poor when Tc was less than 10 μm, indicating that preferably Tc is 10 μm or more from the viewpoint of moisture resistance reliability.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A method for manufacturing a multilayer ceramic capacitor, comprising:
   (i) producing a plurality of dielectric green sheets constituted by barium titanate as a primary component;
   (ii) producing a plurality of internal electrode-printed green sheets by screen-printing some of the plurality of dielectric green sheets obtained in step (i) with a conductive paste;
   (iii) producing a plurality of individually cut unsintered laminates by stacking some of the plurality of dielectric green sheets, as cover layers, obtained in step (i) and the plurality of internal electrode-printed green sheets obtained in step (ii) together to produce an unsintered laminate, followed by cutting the unsintered laminate;
   (iv) producing element body precursors by applying a ceramic paste to side faces of the unsintered laminates obtained in step (iii) for forming side margins thereon, followed by drying the applied ceramic paste, wherein the ceramic paste is constituted by barium titanate as a primary component, and an application thickness of the ceramic paste is adjusted in a manner such that a thickness of the side margins is greater than a thickness of the cover layers after step (v);
   (v) producing element bodies by removing a binder contained in the element body precursors obtained in step (iv), followed by sintering the binder-removed element body precursors in a reducing ambience; and
   (vi) forming external electrodes on at least one of principal faces and on both end faces of the element bodies obtained in step (v),
   wherein steps (iii) and (vi) are conducted in a manner such that Tt representing a thickness of the external electrodes and Tc representing a thickness of the cover layers satisfy a relationship of $1/30 \leq Tt/Tc \leq 4/5$, and
   wherein step (iii) is conducted in a manner such that a thickness of the cover layers, or Tc, is 10 μm or more but 30 μm or less.

2. The method according to claim 1, wherein the external electrodes in step (vi) contains Cu as an external electrode material.

3. The method according to claim 1, wherein in step (vi), the external electrodes are formed by sputtering or deposition on the principal face and the end faces.

4. The method according to claim 1, wherein step (iii) is conducted in a manner such that a thickness of the cover layers, or Tc, is 20 μm or more but 30 μm or less.

* * * * *